United States Patent Office 3,310,734
Patented Mar. 21, 1967

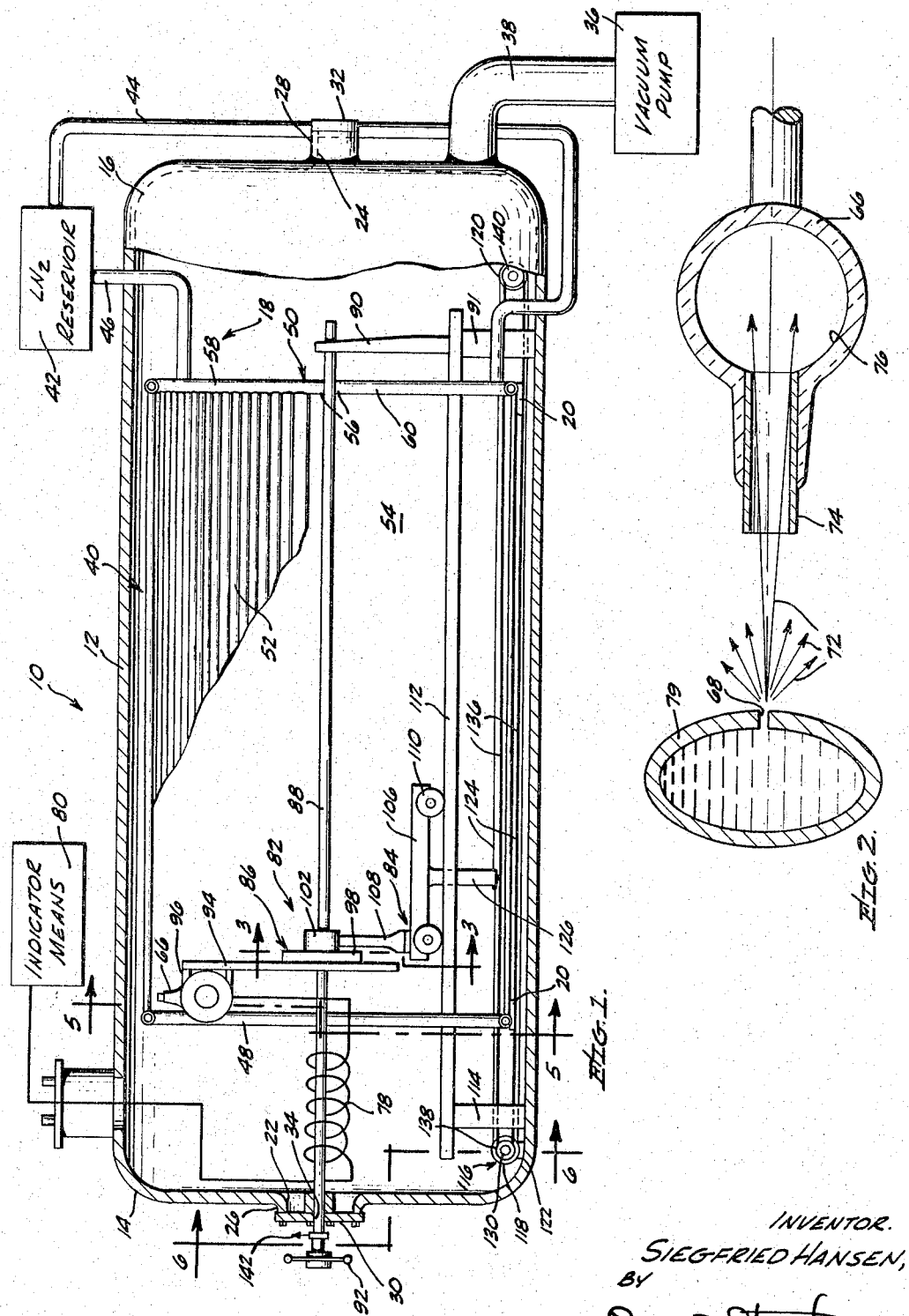

3,310,734
LEAK DETECTION APPARATUS INCLUDING A MOVABLE PRESSURE SENSITIVE GAUGE FOR EVACUATED CHAMBERS
Siegfried Hansen, Los Angeles, Calif., assignor to Hughes Aircraft Company, Culver City, Calif., a corporation of Delaware
Filed Sept. 30, 1966, Ser. No. 583,371
10 Claims. (Cl. 324—33)

The present invention is a continuation-in-part of application, Ser. No. 221,164, now abandoned, filed Sept. 4, 1962, for Directive Leak Sensor.

The present invention relates to an apparatus for detecting leaks in an evacuated chamber by a pressure sensitive gauge, and in particular, to an apparatus for moving the gauge within the interior of the chamber.

Leaks in an evacuated enclosure are often located by the well-known helium mass-spectrometer method wherein small amounts of helium are sprayed on the exterior surface of the enclosure in the area of the suspected leak and the helium is detected in the interior of the enclosure by a mass spectrometer. This method may be appropriate when the location of the leak is approximately known; however, the method becomes time consuming when more than one leak is present and when the leak's location is unknown. Furthermore, the method is inapplicable to evacuated chambers provided with an internal pressurized conduit system since it is not possible to locate the leak or leaks should they appear in the conduit. Other leak detection methods and apparatus have been used in large structures such as wells and pipelines but these apparatus cannot be used for small conduit systems to locate minute leaks therein and are not applicable to conduit systems housed in evacuated chambers. In addition, many leaks do not appear until the evacuated chamber and its associated internal system is placed under normal operative conditions.

An evacuated chamber having a cryogenic system, for example, may be utilized to simulate a space environment, to freeze dry various articles and materials or to effect a cryogenic pumping. Such a chamber may be cylindrically configured and is evacuated by a vacuum pump. It houses internally a cylindrical arrangement of longitudinally extending tubes through which liquid nitrogen or another cryogenic agent is pumped. Because of its intended use, the tubes must be leak free to prevent escape of the coolant into the evacuated chamber; yet, because of the extremely low temperatures caused by the liquid nitrogen, the tube material contracts to open leaks which, under normal room temperatures, would be closed. Prior well-known methods of leak detection are inapplicable to locate leaks under such operative conditions.

The present invention overcomes these as well as other problems by providing an apparatus adapted to move a pressure sensitive gauge over the interior of an evacuated chamber or its internally associated pressurized conduit system. The pressure sensitive gauge is particularly well-suited for detecting leaks in an evacuated chamber since it takes advantage of the pressure pattern of gas emanating from such leaks.

This pressure pattern describes the radial path which gas molecules follow as they freely flow from a leak. Other gas molecules are present in the vicinity of the leak, however, even in an evacuated chamber, and, since these other molecules move randomly, they form a random background. The gas molecules enamating from the leak eventually collide with the randomly moving gas molecules and lose their radially directed flow to become a part of the random background. The function of the pressure sensitive gauge is to detect the gas molecules flowing from the leak before they become a part of the random background and to relay this information to a recording device.

The present invention additionally includes an apparatus for moving the pressure-sensitive gauge or detector longitudinally and circumferentially with respect to an evacuated chamber or the tubes therein so that the entire chamber or arrangement of tubes may be scanned for leaks. The arrangement of tubes may comprise any cylindrical configuration such as a longitudinally extending series of tubes or a single spiral tube or a tubular baffle. The apparatus further includes indicators secured to gauge rotating and gauge reciprocating mechanisms to indicate the position of the gauge with respect to the tubes so that the location of any particular leak may be identified with particularity. In one illustrative embodiment, wherein the leaks to be sought may arise in a highly evacuated chamber having a cryogenic system, the gauge may comprise a vacuum gauge of the ionization type.

It is, therefore, an object of the present invention to provide a simple and accurate means for detecting leaks in an enclosed system.

Another object is the provision of an apparatus for detecting leaks in a series of tubes under actual use thereof.

A further object is to provide an apparatus for the detection of leaks in a cryogenic system positioned in a vacuum.

Other aims and objects as well as more complete understanding of the present invention will appear from the following explanation of an exemplary embodiment and the accompanying drawings thereof, in which:

FIG. 1 is a side elevational view of a first embodiment of the invention positioned within an evacuated chamber having a cryogenic system therein;

FIG. 2 is a cross-sectional view of the envelope of a pressure sensitive gauge of the ionization type and a tube of the cryogenic system;

Figure 3:
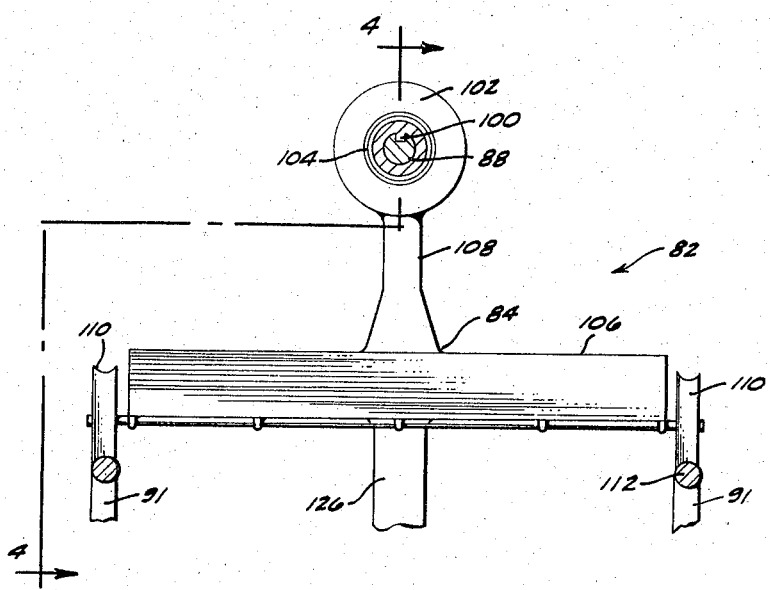
FIG. 3 is a cross-sectional view of the gauge reciprocating and rotating mechanisms taken along lines 3—3 of FIGS. 1 and 4.

Accordingly, with reference to an exemplary embodiment of the invention depicted in FIG. 1, an evacuated chamber 10, comprising a cylindrical portion 12 and integral end portions 14 and 16, is provided with a cryogenic system 18 positioned therein on supporting blocks 20. Openings 22 and 24 in end portions 14 and 16 are formed in flanges 26 and 28 and are disposed along the axis of the chamber for access to the interior thereof. Plates 30 and 32 are sealed and bolted to their respective flanges to close off the chamber, plate 30 having a shaft receiving seal 34 therein. A vacuum pump 36 communicates with chamber 10 through a conduit 38 for evacuating the chamber.

Cryogenic system 18 includes an axially extending, cylindrical tubular baffle 40 through which a cryogenic agent, such as liquid nitrogen, flows by thermal circulation from a reservoir 42 through a supply conduit 44 and an exhaust conduit 46 for creating a cold environment in the chamber. Toroidal manifolds 48 and 50 are secured to opposite ends of the baffle. Baffle 40 is divided into two semicylindrical portions 52 and 54 and communicates fully at one end with manifold 48. Manifold 50, however, is divided into two distinct flow paths by diagonally opposed barriers 56 therein so that portion 52 communicates with a half section 58 of manifold 50 while portion 54 communicates with a half section 60 of the toroidal manifold. Consequently, liquid nitrongen is thermally circulated through a closed circuit comprising reservoir 42, supply conduit 44, half section 60 of manifold 50, portion 54 of tubular baffle 40, toroidal manifold 48, portion 52 of baffle 40, half section 58 of manifold 50, and exhaust conduit 46. A flange 62 (see FIG. 6) extends from one side of cylindrical portion 12 of chamber 10 and is provided with a window 64 which is sealed and secured thereto to enable one to view the interior of the chamber.

The combination of evacuated chamber 10 and cryogenic system 18 may comprise a simulated space environment. Since the purpose of this environment is to simulate outer space, it must approximate a very good vacuum as well as a very cold setting. Leaks in baffle 40, however, permit liquid nitrogen to enter the interior of the chamber and the presence of such nitrogen destroys the vacuum in the chamber. Consequently, the baffle must be leakproof to provide a properly functioning simulated space environment. It is necessary, therefore, to detect and locate the presence of any leaks in tubular baffle 40 so that they may be sealed, as by welding, before the system can be placed in operation. The present invention is useful for detecting and locating such leaks.

In a preferred embodiment, the invention utilizes a vacuum gauge 66 of the ionization type, such as, for example, the Ionization Manometer described in Patent No. 3,153,744 issued to F. L. Torney, Jr., on Oct. 20, 1964. It is to be understood, of course, that other ion gauges, which are capable of detecting very low pressures and which are well-known in the art, may be employed. The gauge is provided with a high sensitivity to very low pressures so that it will detect the presence of even a relatively small number of leak molecules. As shown in FIG. 2, when liquid nitrogen escapes through a leak 68 in a tube 79, the liquid nitrogen flows in a linearly directed radial path as indicated by arrows 72. The gauge is positioned close to tube 68 so that any gas molecules will enter the gauge through a gauge tabulation 74 with linear directivity. Upon entering the gauge interior 76, the molecules become randomized and their presence is detected by the gauge. This information is relayed to the exterior of the chamber through electrical conduit 78 (see FIG. 1) and to an indicator 80 which may comprise a meter or other recorder. The complete baffle may be inspected for leaks by gauge 66 by movement thereof throughout the entire tubular system.

The gauge is moved by a leak detection apparatus 82 which comprises a gauge reciprocating mechanism 84 and gauge rotating mechanism 86. The gauge rotating mechanism comprises a shaft 88 which is rotatably supported at one end by a standard 90 and which extends through seal 34 of plate 30 to the exterior of the chamber. Standard 90 is positioned on uprights 91 for connection to the bottom of the chamber. A hand wheel 92 is secured to the externally extended end of the shaft.

Figure 4:
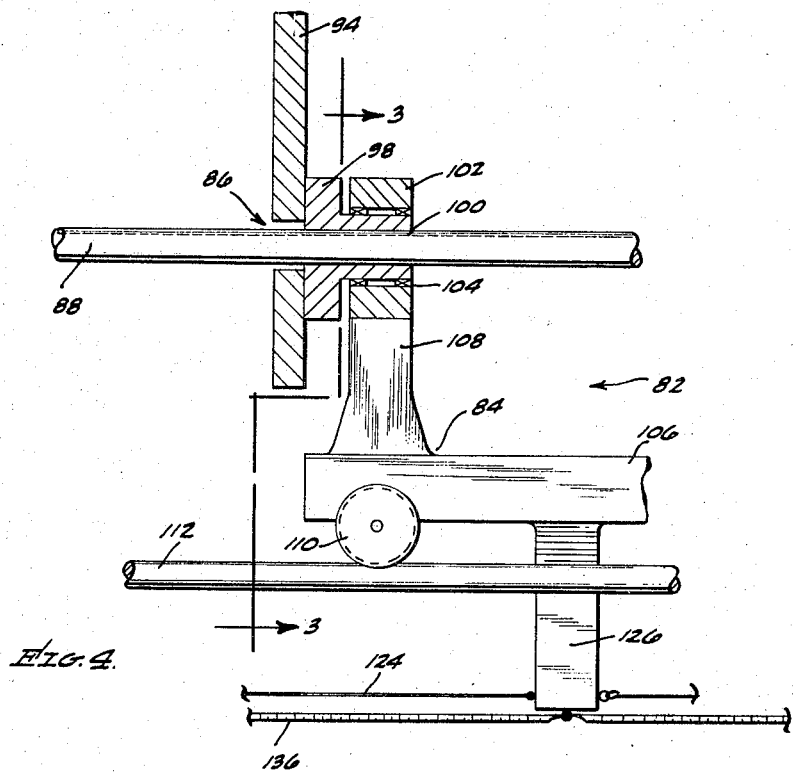
FIG. 4 is a cross-sectional view of a portion of the gauge reciprocating and rotating mechanisms taken along lines 4—4 of FIG. 3.
Figure 5:
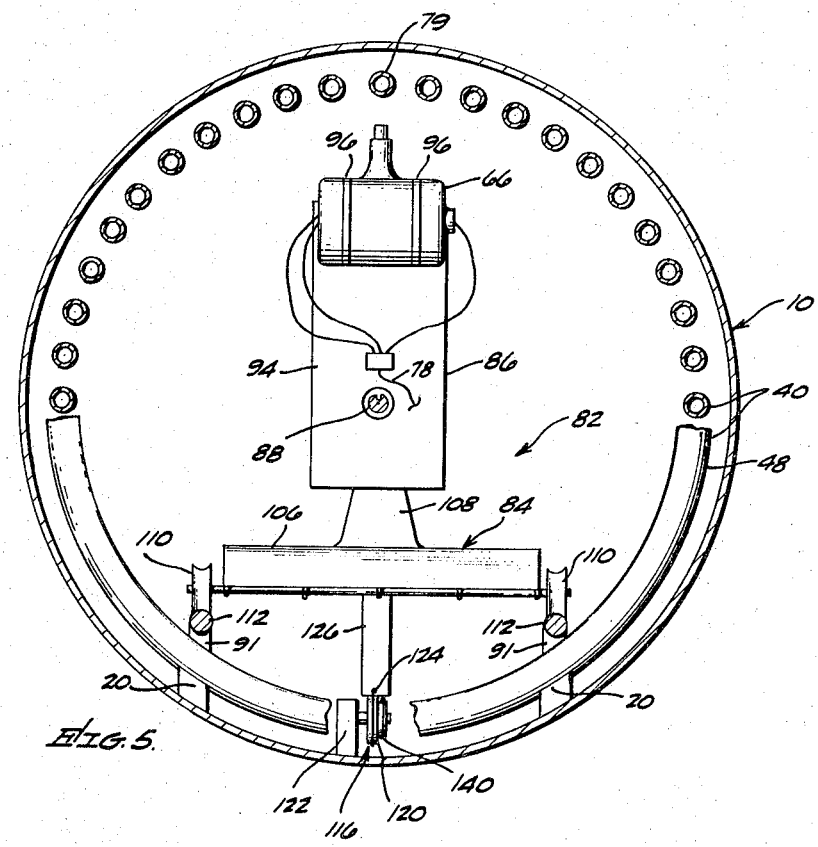
FIG. 5 is a cross-sectional view of the gauge reciprocating and rotating mechanisms taken along lines 5—5 of FIG. 1.

As best shown in FIGS. 3–5, the gauge rotating mechanism comprises a support 94 at one end of which the gauge is secured by a clamp and block mount 96. Support 94 is integral with a bearing pivot 98 which is provided with a splined connection 100 to shaft 88. The bearing pivot is journaled in a bearing support 102 by means of a bearing 104. Consequently, when hand wheel 92 is rotated, gauge 66 rotates therewith through the splined connection, bearing pivot 98 and support 94.

Reciprocation of the gauge with respect to baffle 40 is accomplished through mechanism 84 which includes a carriage 106. A vertical member 108 is secured to the carriage and is provided with bearing block 102 at one end thereof. Four wheels 110 are journaled on the carriage and roll on tracks 112 which are attached to the interior of chamber 10 by uprights 91 and 114, one of which supports standard 90 as described above. As shown in FIG. 1, the uprights are placed beyond the ends of baffle 40 and toroidal manifolds 48 and 50 to avoid interference with the baffle and, as illustrated in FIG. 5, the rails are positioned adjacent to the tubular baffle to prevent interference with the leak detection operation. In addition, the rails are positioned beyond the extreme radius of the gauge at tubulation 74 so that the gauge may make a complete rotation.

Figure 6:
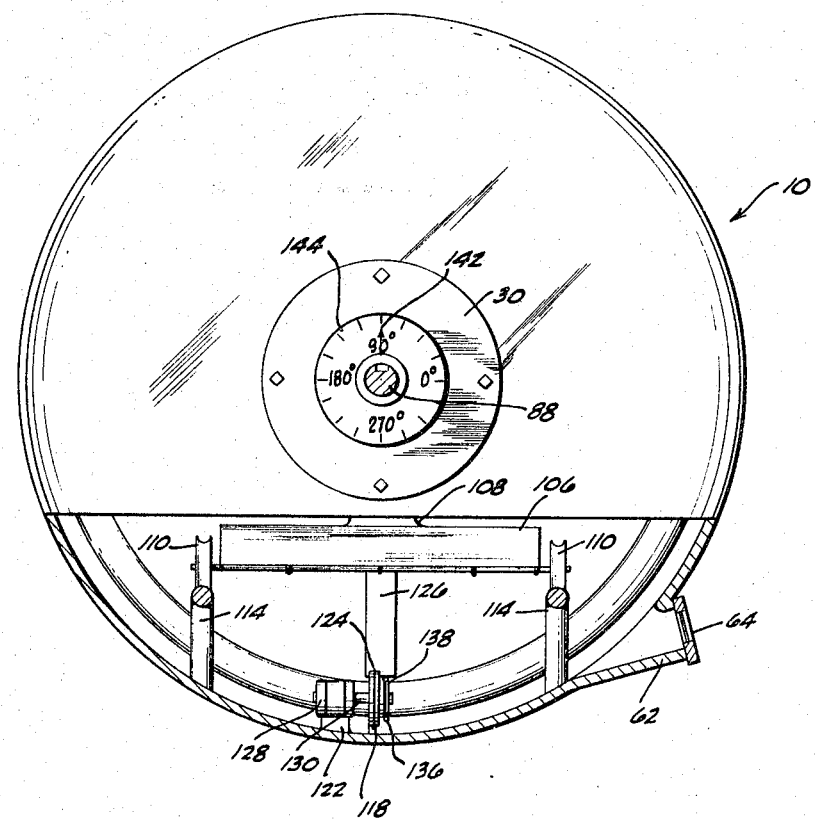
FIG. 6 is a cross-sectional view showing the angular and translational locater means taken along lines 6—6 of FIG. 1.
Figure 7:
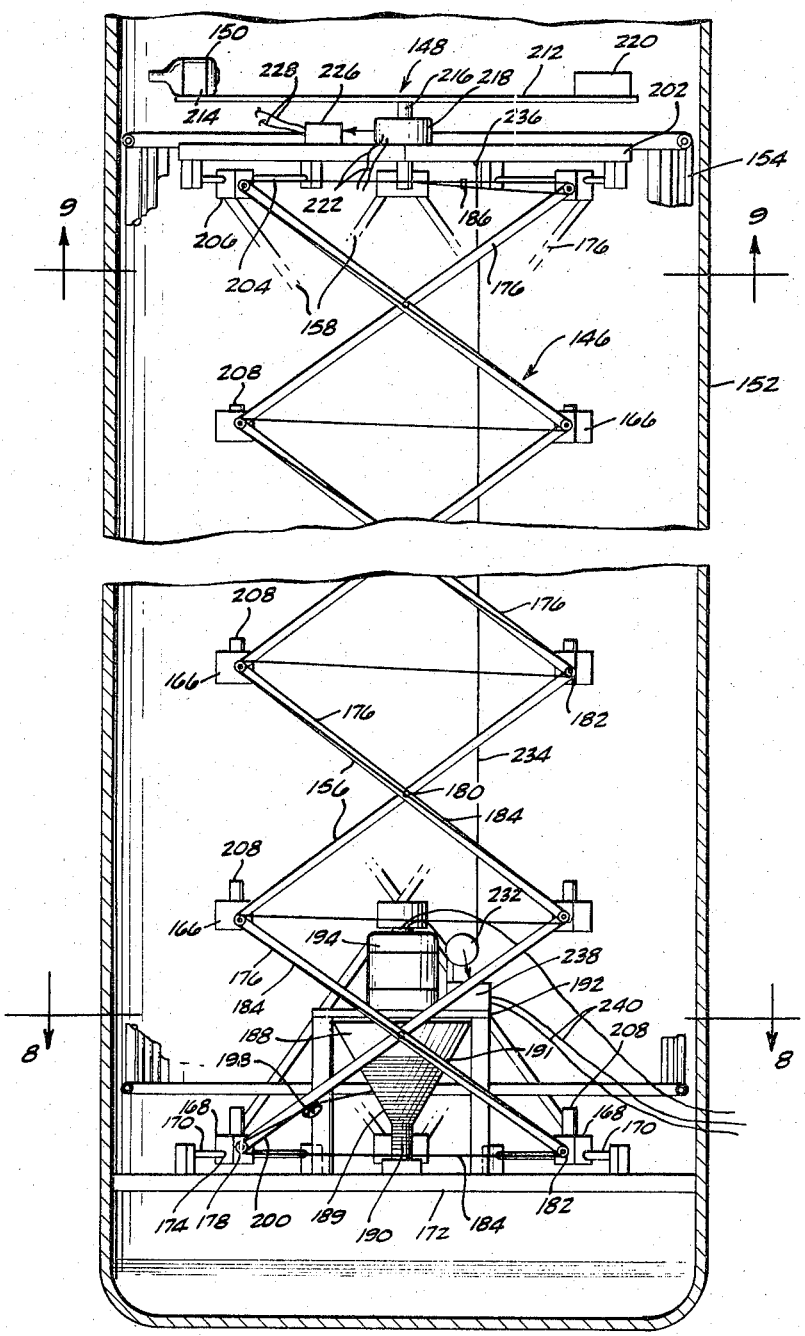
FIG. 7 is partly sectional view taken along lines 7—7 of FIG. 8 and is another embodiment of the invention for detecting leaks in a vertical chamber similar to the horizontal type depicted in FIG. 1.
Figure 8:
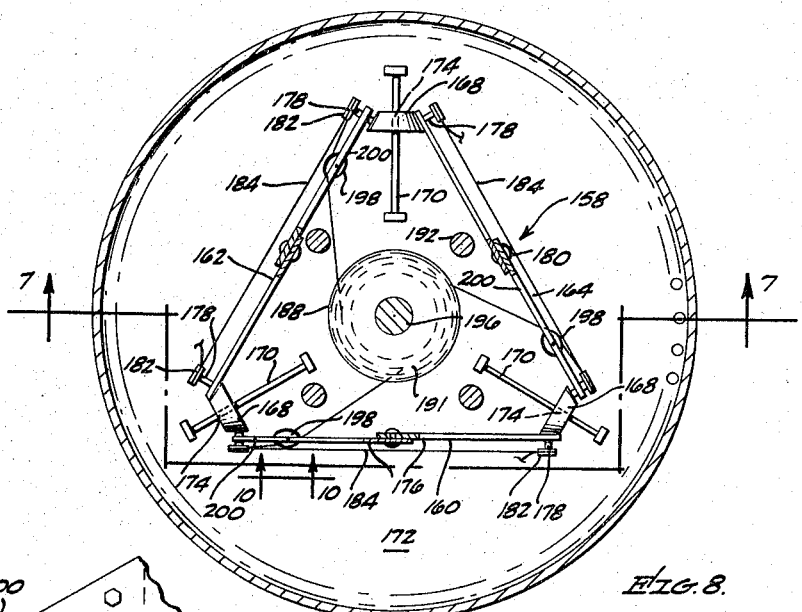
FIG. 8 is a view of the gauge reciprocating mechanism taken along lines 8—8 of FIG. 7.
Figure 10:
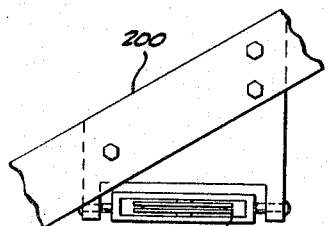
FIG. 10 is a view of a guide pulley taken along lines 10—10 of FIG. 8.
Figure 9:
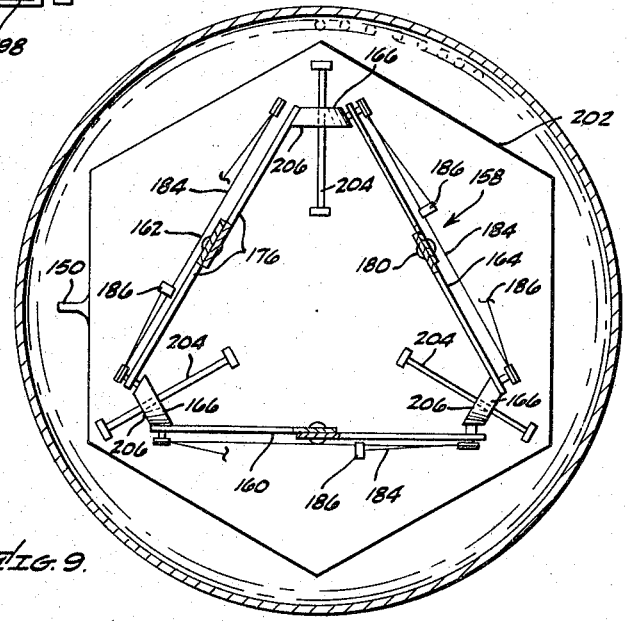
FIG. 9 is a view of the second embodiment taken along lines 9—9 of FIG. 7.

The carriage is moved axially of the tubes by means of a driving mechanism 116 (see FIGS. 1, 5 and 6). The driving mechanism comprises a pair of pulleys 118 and 120 which are rotatably secured between tracks 112 on the bottom of chamber 10 by a support 122. A cable 124 is secured to carriage 106 by downwardly extending attachment 126 and extend about pulleys 118 and 120. A motor 128 (see FIG. 6), secured to chamber 10 by support 122, is provided with a drive shaft 130 which drives pulley 118. A graduated tape 136 (see FIG. 4, in particular) is similarly secured to carriage 106 by attachment 126 and extends about pulleys 138 and 140. As depicted in FIG. 6, tape 136 is visible through window 64 of flange 62 so that the axial position of gauge 66 along baffle 40 may be ascertained.

The rotational position of gauge 66 is determined by means of a pointer 142 (see FIGS. 1 and 6) which is affixed to shaft 88 on the exterior of chamber 10. A circular scale 144, which is divided into 360°, is affixed to plate 30 so that pointer 142 moves with respect to scale 144.

When it is desired to detect a leak, gauge 66 and leak detection apparatus 82 is positioned within the interior of the chamber on tracks 112 and the chamber is closed by plates 30 and 32. Chamber 10 is evacuated by means of pump 36 and liquid nitrogen is caused to flow through tubular baffle 40. The gauge is moved longitudinally with respect to baffle 40 along shaft 88 scanning an axially extending portion of the baffle. When the gauge has reached one of toroidal manifolds 48 and 50, hand wheel 92 is rotated a small amount to rotate the gauge by the same extent and apparatus 82 is longitudinally moved by carriage 106 and motor 128 toward the opposite toroidal manifold. Any leaks which may exist in the baffle are detected through tubulation 74 and this information is relayed to indicator 80 through wires 78. The operation of reciprocating and rotating the gauge within the chamber continues until the whole of the baffle has been scanned.

FIGS. 7–10 illustrate a second embodiment of the invention including a gauge reciprocating mechanism 146 and a gauge rotating mechanism 148 for moving a leak detecting gauge 150 in an evacuated chamber 152 having a cryogenic baffle 154. The baffle is supplied with a cryogenic agent, such as liquid nitrogen, and the chamber is evacuated by a vacuum pump in a manner similar to that depicted in FIG. 1.

The gauge reciprocating mechanism includes a lazy tong assembly 156 which is positioned on the bottom of chamber 152. The assembly includes a triangular frame 158 (see FIG. 8) of three inter-connected lazy tong structures 160, 162 and 164, which are pivotally secured to each other by intermediate floating corner blocks 166 and end corner guide blocks 168. Rails 170 are secured to a base 172 which rests on the bottom of chamber 152 and extend through bearings 174 in end corner guide blocks 168. Each lazy tong structure comprises a series of links 176 which are secured at their ends to floating corner blocks 166 by pivots 178 and are crossed and pivoted at their midpoints by pins 180.

Pulleys 182 are journalled on pivots 178 at each corner of the links. Three cables 184 are each extended over pulleys 182 and extend along the links. Each cable is secured at the upper end of the lazy tong structure by a clamp 186. The other end of each cable is wound about a winch drum 188 having a tapered portion 189 and a cylindrical portion 190, the taper decreasing in radius towards the cylindrical portion. A triple threaded groove 191 is provided on portions 189 and 190 for receiving each of the three cables. The drum is rotatably mounted on a support 192 and base 172 and is driven by a motor 194 having a drive shaft 196. In order to provide a proper feed to and from grooves 191 of the drum, a guide pulley 198 (see FIG. 10) is pivotally secured to one link 200 on each of the lazy tong structures.

A platform 202 is provided with three radially extending rails 204 which extend through bored floating corner blocks 206 to which the links and pulleys are also pivotally secured. Stops 208 (see FIG. 7) are secured to blocks 166 and 168 to prevent complete collapse of the lazy tong assembly and to enable the initial raising of platform 202.

In operation, as drum 188 is rotated by motor 194 to wind cables 184 thereabout, the cables are shortened to draw blocks 166, 168 and 206 toward each other. Links 176, as a consequence, pivot about pivots 178 and pins 180 to raise platform 202 within chamber 152. During this movement, rails 204 slide within blocks 206 and guide pulley 198 moves with respect to grooves 191 to ensure the proper feeding of the cable therein. Conversely, when it is desired to lower platform 202, cables 184 are fed from drum 188 so that the platform may descend under the influence of gravity. Since the initial force required to raise the platform is greater than subsequent forces, drum 188 is tapered toward the bottom in order to permit the greatest platform raising force to be exerted at the smaller radii.

Gauge 150 is secured to a rotatable support 212 by means of an attachment clamp and bearing block mount 214. The support is secured to a driving shaft 216 which is rotated by a motor 218 mounted on platform 202. A counter-weight 220 is attached to the support diagonally opposed to gauge 150 for balance thereof. Gauge 150 is of the type discussed previously so that very low pressures from leaks within the cryogenic baffle 154 may be detected. Electrical leads 222 lead from gauge 150 to a recording device for relay of pressure information from the gauge.

The position of guage 150 with respect to baffle 154 is ascertained by an electrical rotational position transmitter 226 which is connected to motor 218 and which transmits rotational position information through leads 228 to an indicator on the exterior of the chamber. The height of gauge 150 with respect to baffle 154 is determined by means of a spring-biased drum 232 which is secured to support 192. A cord 234 is attached at one end to platform 202 by a hook 236 and is wound about drum 232 for extension from or retraction about the drum. An electrical height position transmitter 238 is connected to the drum for detecting the extension of cord 234 and the position of gauge 210 along baffle 154. A lead 240 relays this information to an indicator positioned on the exterior of the chamber.

Although the invention has been described with reference to particular embodiments thereof, it should be realized that various changes and modifications may be made therein without departing from the spirit and scope of the invention.

What is claimed is:

1. A leak detection apparatus for use in an evacuated closed ended cylindrical chamber provided with a cryogenic system including a longitudinally extending cylindrically arranged tubular system positioned adjacent to the interior surface of the chamber: said leak detection apparatus including an ionization gauge and detection recording means connected to the gauge for scanning the system and for detecting gaseous emissions from leaks in the system; said apparatus comprising a gauge rotating mechanism and a gauge reciprocating mechanism for movement of the gauge with respect to the system; said gauge rotating mechanism comprising a rotatable shaft axially journaled in the chamber and extending out of one end of the chamber and a support splined to said shaft and provided with means mounting the gauge; said gauge reciprocating mechanism comprising a carriage reciprocable on tracks secured to the interior surface of the chamber, a bearing secured to said carriage and rotatably journalling said support; and rotation and reciprocation indicator means associated with said shaft and said carriage for indicating the position of the gauge with respect to the system.

2. In an evacuated closed ended cylindrical chamber provided with a cryogenic system including a longitudinally extending cylindrical arranged tubular system positioned adjacent to the interior surface of the chamber: a leak detection apparatus including an ionization gauge and detection recording means connected to the gauge for scanning the system and for detecting gaseous emissions from leaks in the system; said apparatus comprising a gauge rotating mechanism and a gauge reciprocating mechanism for movement of the gauge with respect to the system; said gauge reciprocating mechanism comprising a triangular frame of three interconnected lazy tong structures affixed at an end thereof to one end of the chamber, a platform affixed to another end of said frame and reciprocable therewith and drive means secured to said platform for reciprocation thereof; said gauge rotating mechanism comprising a rotatably driven support journaled on said platform and provided with means mounting the gauge; and rotation and reciprocation indicator means associated with said support and said platform for indicating the position of the gauge with respect to the system.

3. A leak detection apparatus for sensing leaks in an evacuated chamber comprising a pressure-sensitive detector, a detector reciprocating mechanism secured within the chamber, a detector rotating mechanism including a support carried by and journaled on said reciprocating mechanism and provided with means mounting said detector, and locater means associated with said mechanisms for indicating the position of said detector within the chamber.

4. An apparatus as in claim 3 wherein said reciprocating mechanism includes guides affixed with respect to the chamber, a carriage reciprocably mounted on said guides, and bearing means secured to said carriage and having a journaled connection with said support.

5. An apparatus as in claim 4 wherein said rotating mechanism further includes a rotatable shaft axially positioned within the chamber and drivingly connected to said support by a splined connection, said shaft having an end extending out of the chamber for rotation thereof.

6. An apparatus as in claim 3 wherein said reciprocating mechanism includes a lazy tong assembly having an end portion connected to the chamber and a second portion reciprocable therein, and connection means securing said support to said second portion.

7. An apparatus as in claim 6 wherein said lazy tong assembly comprises a triangular frame of three interconnected lazy tong structures provided with a slidable connection with the chamber at said end portion.

8. An apparatus as in claim 7 further including a driving tapered winch drum having a triple threaded groove means, pulley means connected to said three interconnected lazy tong structures and cables wound about said pulley means and said drum within said groove means whereby rotation of said drum shortens or lengthens said cables for operation of said lazy tong structures.

9. An apparatus as in claim 6 wherein said connection means includes a platform slidably connected to said lazy tong assembly and a journal on said platform connected to said support.

10. A lazy tong assembly comprising: a triangular frame of three interconnected lazy tong structures and lazy tong structure operating means, pulley means connected to said three lazy tong structures, said lazy tong structure operating means including a driving tapered winch drum having a triple threaded groove means, and cables wound about said pulley means and said drum withing said groove means whereby rotation of said drum shortens or lengthens said cables for operation of said lazy tong structures.

No references cited.

WALTER L. CARLSON, *Primary Examiner.*

CHARLES F. ROBERTS, *Examiner.*